Sept. 8, 1925.

J. E. ECKERSLEY 1,552,985

COMBINED VENEER AND SHINGLE CUTTING MACHINE

Filed May 8, 1925     10 Sheets-Sheet 7

Sept. 8, 1925.  1,552,985
J. E. ECKERSLEY
COMBINED VENEER AND SHINGLE CUTTING MACHINE
Filed May 8, 1925  10 Sheets-Sheet 8

Inventor
James E Eckersley
By
Attorney

Patented Sept. 8, 1925.

1,552,985

UNITED STATES PATENT OFFICE.

JAMES E. ECKERSLEY, OF SEATTLE, WASHINGTON.

COMBINED VENEER AND SHINGLE CUTTING MACHINE.

Application filed May 8, 1925. Serial No. 28,929.

*To all whom it may concern:*

Be it known that I, JAMES E. ECKERSLEY, a citizen of the United States, residing at Seattle, in the county of King and State of Washington, have invented certain new and useful Improvements in Combined Veneer and Shingle Cutting Machines, of which the following is a specification.

The primary object of my invention is to provide a shingle and veneer cutting machine which is simple in construction and operation, efficient, relatively low in cost of manufacture, and which may be readily installed at the source of timber, or any other desired place.

The further object of my invention is to provide, in a machine of this character, means whereby the block may be evenly and positively moved toward the knife and held in proper position to be operated upon by the knife.

A further object of my invention is to provide feeding means whereby an irregular block may be fed at one end more than the other end to permit of the cutting of the butt end of the shingle from the same end of the block until the block becomes regular in shape, and thereafter to feed the block so that the butt ends of the shingle will alternately be cut from one end of the block and from the other end of the block.

A further object of my invention is to provide means for feeding a plurality of blocks whereby the blocks may be fed to cut the standard shingles, or what is known as "dimension" shingles.

A further object of my invention is to provide, in connection with the feeding rolls for the block, means to hold a "spalt" while the shingles are being cut therefrom; and with these and other objects in view my invention consists of the parts and combination of parts as will be hereinafter more fully set forth.

Figures 5, 6:
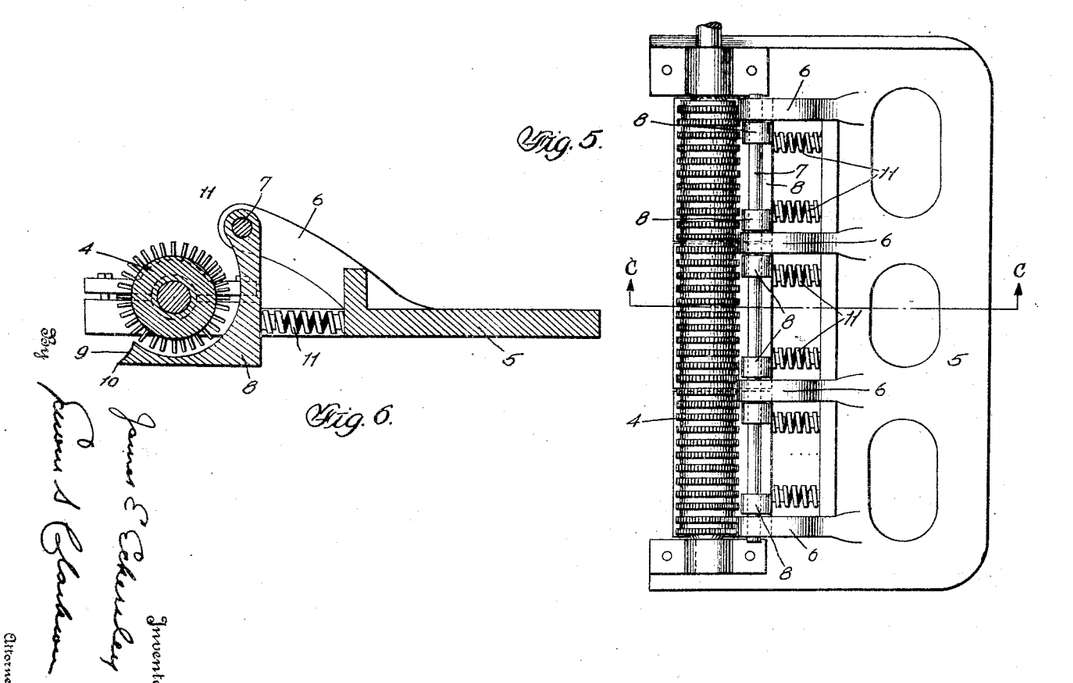
Figure 5 is a top plan view of one of the feed rolls with its associated parts detached.
Figure 6 is a sectional view on the line C—C, Figure 5, looking in the direction of the arrow.
Figure 7:
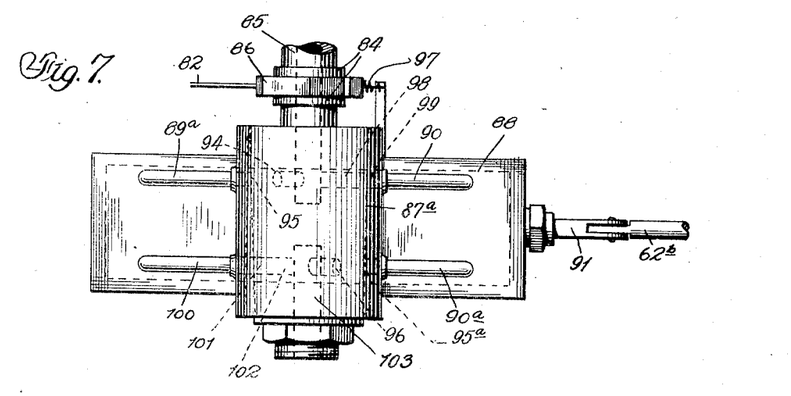
Figure 7 is a top plan view of an air or steam control cylinder for the feed rolls.
Figure 8:
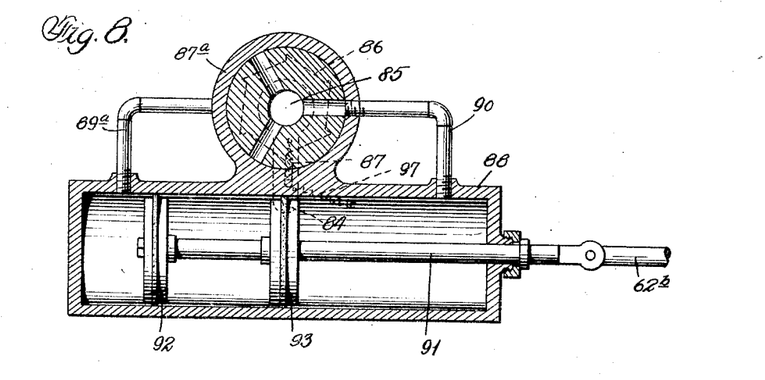
Figure 8 is a vertical central section of the same.
Figure 9:
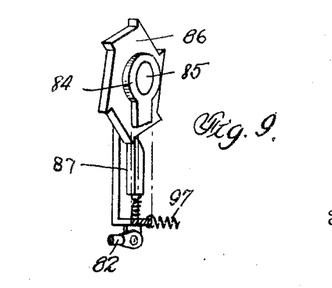
Figure 9 is an enlarged detail view.

The reference numeral 1 designates the bed plate of the machine which may be supported on suitable frame 2. This bed plate is provided with a suitable opening therethrough through which the block 3 is fed to the knife. At each end of the block opening I provide block feeding rolls 4. These feeding rolls are mounted on a plate 5 which is suitably secured to the bed plate. There are a series of upwardly and forwardly projecting arms 6 integral with the plate 5 in which is journalled a shaft 7. Presser bars 8 are pivotally mounted on the shaft 7. These presser bars are substantially L shape in cross section, the lower member of the bar projecting under the feed roll 4 with its forward end extending slightly beyond the periphery of the feeding roll and concaved as at 9. It will be noted that the upper end of the concave is approximately in the plane of the bottom of the teeth on the feeding roll 4, while the lower end of the concave is slightly in advance of the periphery of the feeding roll as will be seen more clearly in Figure 6, the point 10 being adapted to pierce spalts and hold them firmly in the cutting operation. The concave 9 functions as a guide to receive the lower corners of the block, the block sliding downwardly on the concave face 9 thereby moving the presser bars 8 slightly toward the rear against the tension of the springs 11 until the block 3 passes below the point 10 whereupon the point 10 penetrates the end of the spalt under the pressure of the springs 11 and holds the spalt in position.

These feed rolls are operated by suitable shafts 12 and 13, which are provided with spline joints intermediate their ends.

At the rear of the bed plate I secure bearing standards 13ª, 14 and 15, which standards are adjustably mounted whereby they may be positioned to accommodate the spreads of the feed rolls to take care of stock of different lengths and prevent placing of unnecessary or unusual strain on the universal joints of the shafts.

On the bearing standard 14 I revolvably mount the stub shaft 16 secured to the bearing standard by means of the cap 17. On this shaft 16 I revolvably mount the bell crank lever having arms 18 and 19, the arm 19 being provided with the elongated arcuate slot 20 and at the opposite end of the arm 19 I pivotally mount a plurality of pawls 21 which are adapted to engage the ratchet wheel 22. On this same shaft 16 I also revolvably mount a link 23 pivoted to which at its upper end are a series of pawls 24 also adapted to engage the ratchet wheel 22 and propel said ratchet wheel and the shaft 16 and in turn the shaft 13.

Mounted on the bearing standard 15 is a stub or shaft 25, bell crank lever 26, carrying pawls 27 adapted to engage the ratchet wheel 28, said bell crank lever having an elongated arcuate slot 29, the shaft 25 also having mounted on it the link 30, carrying pawls 31. The parts 25 to 31 just immediately above described are of duplicate construction to the parts 16 to 24 described in detail.

35 is an adjustable rod pivotally mounted at one end to the link 30 and secured at its other end by means of the pin 36 in the slot 20 of the bell crank lever 19. The adjustable rod 37 is pivotally mounted at one end to the link 23 and at its other end is secured in the slot 29 of the bell crank lever 26 by means of the pin 38. The bell crank levers are connected at their upper ends by means of a rod 39. The shaft 25 is connected by universal joint to the shaft 12.

Figure 1:
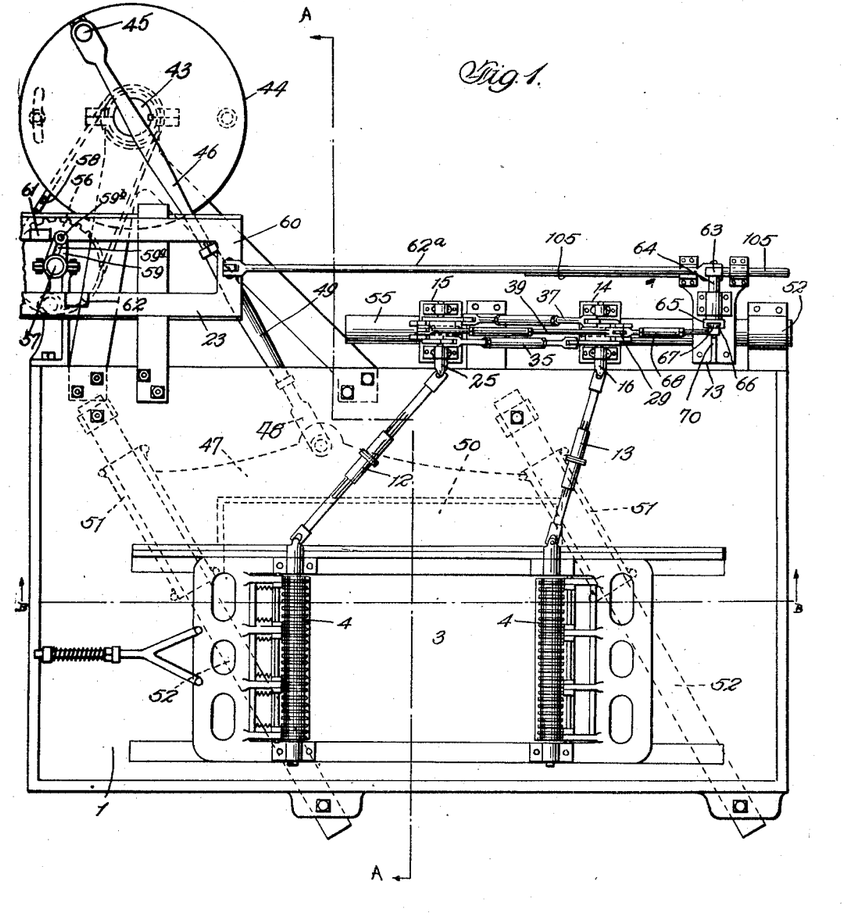
Figure 1 is a top plan view of my improved shingle machine, parts being broken away.
Figure 2:
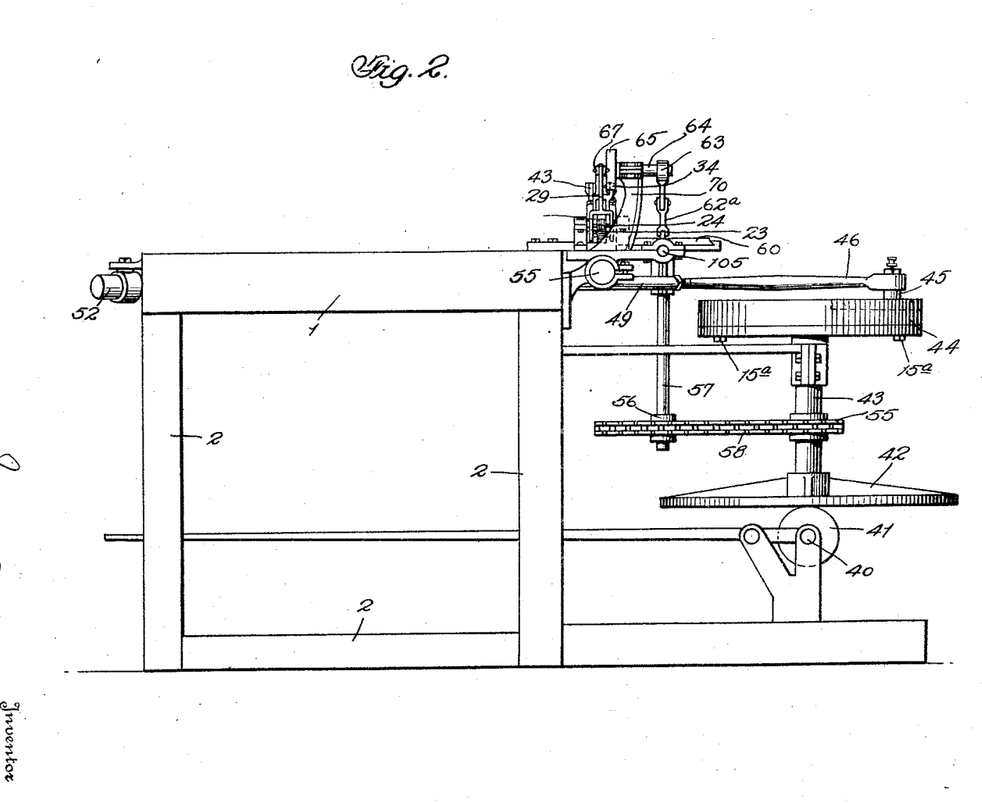
Figure 2 is an end elevation of the same looking toward the left of Figure 1.
Figure 3:
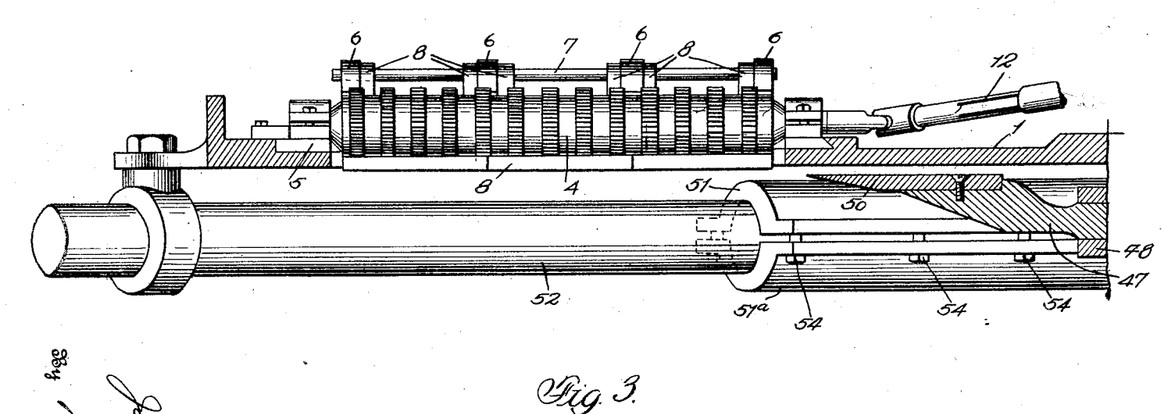
Figure 3 and Figure 3ᴬ (to be read together) are sectional views on line A—A, Figure 1, looking in the direction of the arrow.
Figure 3A:
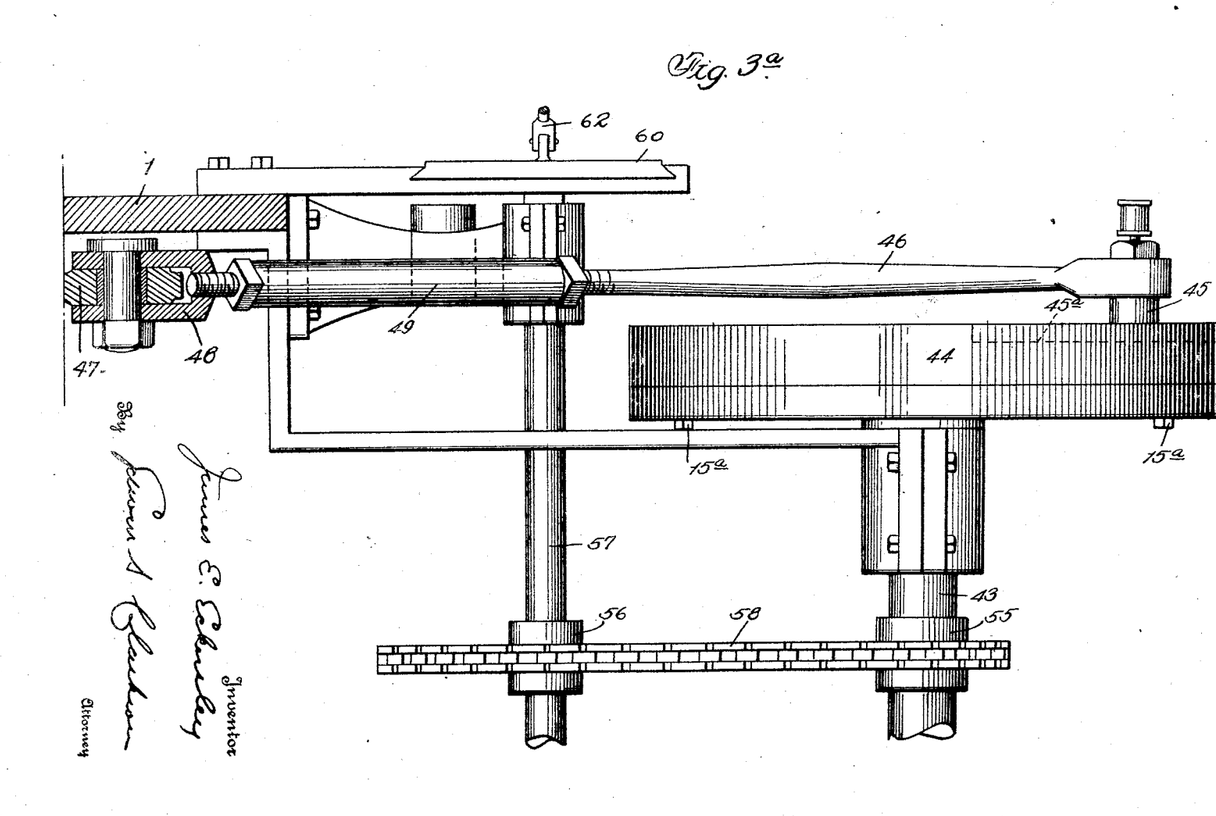
Figure 4:
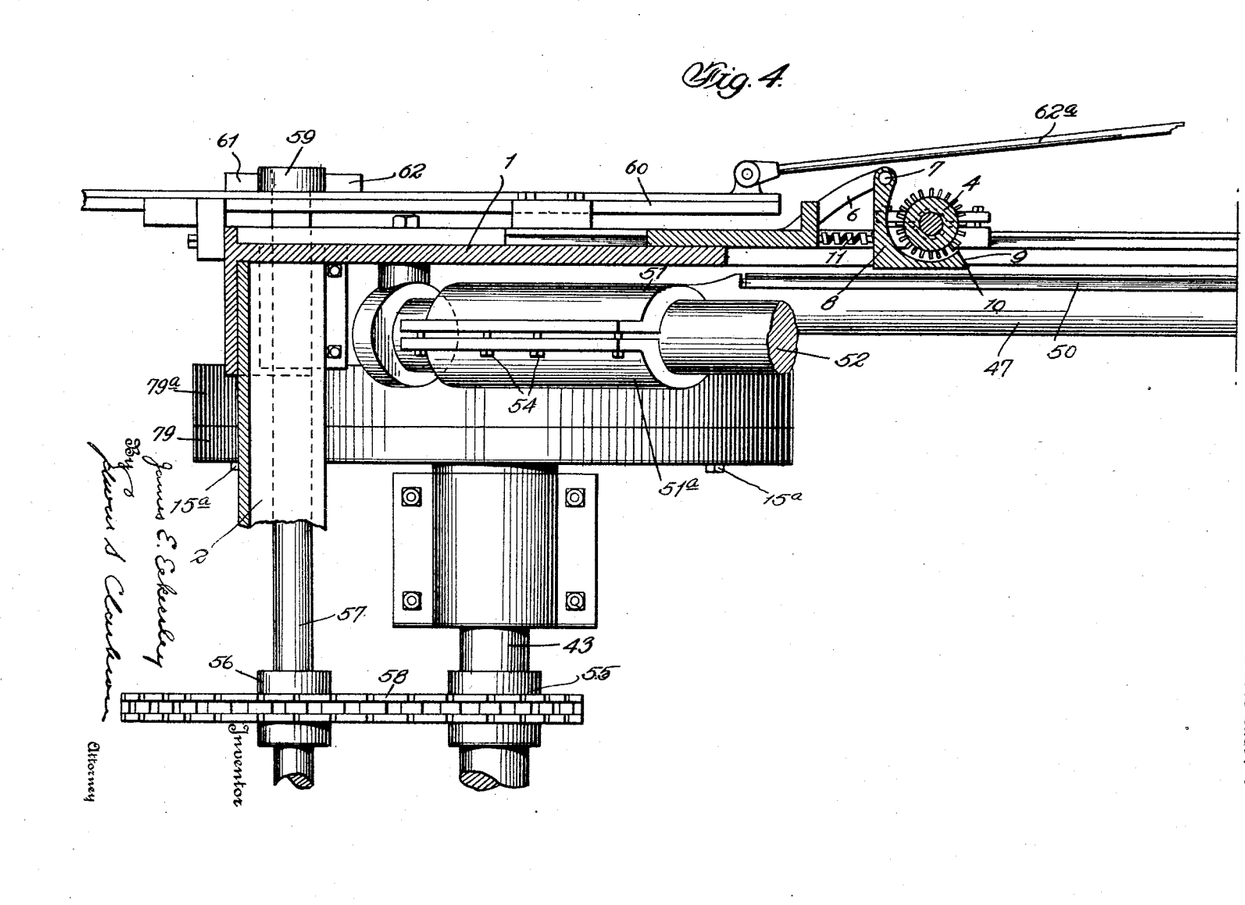
Figure 4 and Figure 4ᴬ (to be read together) are sectional views on the line B—B, Figure 1, looking in the direction of the arrows.
Figure 4A:
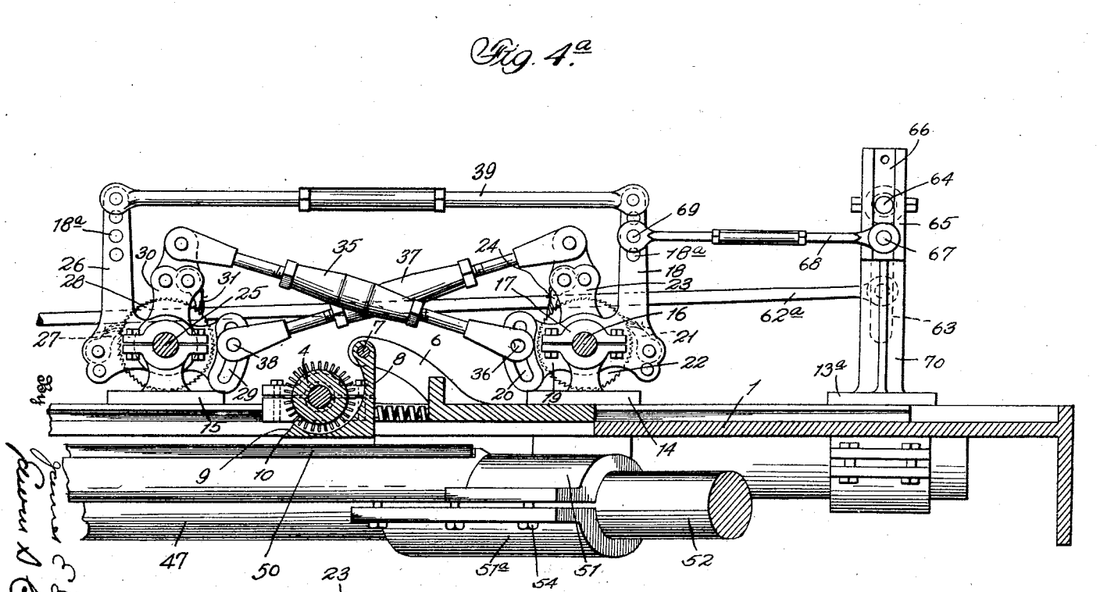

The shaft 40 (Figure 2) is driven from a suitable source of power and has mounted on its a friction drive 41 which drives friction disc 42, said disc in turn driving the shaft 43, which in turn operates the crank wheel 44 having a suitable wrist pin 45 to which the pitman 46 is connected at one end, said pitman at its other end being in turn connected to the knife bar 47 through the staple or clevis 48. The wrist pin 45 is secured in a slot 45ª in the wheel 44, so that it may be adjusted to compensate for different lengths of throw of the knife and the wear of the knife. As shown in Figure 3ª there is a turn-buckle 49 incorporated in the pitman 46 for purposes of adjustment. 50 is the knife carried by the knife bar 47. The knife bar is mounted on a slidable frame 51 which in turn is slidably mounted on the rods 52, and held thereon by means of the cap 51ª, said rods being secured to the frame of the machine. It will be noted that the cap 51ª is held on the frame 51 by means of the bolts 54.

Mounted on the shaft 43 is a chain gear wheel 55 in alignment with the chain gear wheel 56, which latter wheel is secured to the shaft 57, the chain 58 connecting the wheels 55 and 56. This shaft 57 extends above the bed plate of the machine and has secured to its upper end an arm 59 which is provided with a slot 59ª, thereby permitting of adjustment of the roller 59ᵇ.

60 is a frame slidably mounted in suitable bearings, and 61 and 62 are cams mounted on the side arms of the frame 60, which cams are adapted to be engaged by the roller 59ᵇ whereby the frame 60 is moved backward and forward in the operation of the machine. 62ª is a rod connected at one end to the frame 60. The rod 62ª is connected at its other end to an arm 63 which is mounted on the stub shaft 64. At the other end of the stub shaft 64 and toward the front of the machine I secure a lever 65 having an elongated slot 66 in which slot is mounted a suitable pin 67 to the outer end of which one end of the rod 68 is pivotally connected, the other end of the rod 68 being pivotally connected at 69 to the bell crank lever 18.

A block 3 is placed between the feed rolls 4 and the feed rolls, through the operation of the shafts 12 and 13, which are operated by the stub shafts 25 and 16 feed the block downwardly to present the lower face of the block in proper position to be sliced by the knife 50. It will be noted that the path of the knife is oblique to the position of the block 3. In my experience I find that this oblique cut by the knife on the block I am enabled to produce a better cut and resulting shingle. As the shingles are cut from the lower face of the block the feed rolls feed the block downwardly until nothing but a spalt is left and the spalt becomes comparatively thin and passes beyond control of the feed rolls, when another block passes between the feed rolls and is fed down to contact with the spalt, thereafter the feeding of the new block by the feed rolls forces the spalt down into engagement with the concave face 9 of the presser bars 8 and continued downward pressure on the spalt causing the spalt to ride on these concave faces and force the pressure bars pivotally against the tension of the springs 11 whereupon the spalt passes off the concave face 9 into engagement with the point 10 whereupon it is held in position to be engaged by the knife, and this operation is repeated until all available material in the spalt is cut up into shingles whereby I am enabled to get a maximum amount of shingles or veneer from a given dimension of block.

As the power is transmitted from the shaft 40 through the friction drive 41 and 42 a shaft 43, the knife, through the disc 44, wrist pin 45, and pitman 46, is reciprocated.

Power is then transmitted through the chain 58 to the shaft 57 to the arm 59, which in its revolution engages respectively the cams 61 and 62 whereby the frame 60 is reciprocated thereby pulling on rod 62$^a$, which in turn operates the shaft 64 and the slotted lever 65 which through the pin 67 pushes on the rod 68, which in turn operates the bell crank lever 18 and this through its pawls 21 operates the ratchet wheel 22 on the stub shaft 16, shaft 13 and the feed roll 4 at the right of the machine. The connecting rod 39 connects bell crank lever 18 to the bell crank lever 26, when lever 18 is moved to the left, the rod 35 is moved through the pin and slot connection 20, 36, to link 30 operating pawls 31, ratchet 28, stub shaft 25, and power shaft 12 to feed roll 4 at the left, whereby the rolls are operated to feed the block through the machine to the knife.

When it is desired to even up an irregular shaped block I throw out pawls 31 and 21, manipulating the pin and slot connection 29, 38, to regulate the length of throw of the pawls 24 and operate only pawls 27 and 24 which results in shingles being cut only at every other movement of the knife, the thick end of the shingle being cut from the same end of the block, or the pawls 24 and 27 may be thrown out and pawls 31 and 21 operated and the pin and slot connection 36, 20 adjusted, as the shape of the block may require. When enough has been taken off of the block to bring the upper and lower faces thereof in substantial parallelism the pawls 21 and 31 are then thrown into operation after which the shingles are cut at every movement of the knife, the butts or thick end of the shingle being cut alternately from one end of the block and then from the other end of the block.

It frequently happens that the ends of the block are more or less uneven and have certain irregularities, therefore I have provided a plurality of presser bars 8 so that the individual bars are capable of taking care of the particular irregularity which one bar may encounter without effecting the grip of the other presser bars on the end of the block. In an interval of time between the operation of cams 61 and 62 the knife is making its cut. When the bell crank lever 18 is operated the rod 35 through the pin and slot connections 20 and 36 operates the link 30 thereby pushing down on the pawls 31 and operating the ratchet 28. The bell crank levers are provided with a series of openings 18$^a$ for adjusting the throw of their movement.

When it is desired to use this machine for cutting slats of even thickness throughout their length for crates, boxes, etc., I disconnect the rod 39 and substitute a rod X connecting the bell crank lever 26 direct to the upper end of the arm 65 and then disconnect or throw out of operative position pawls 24 and 31 so that the block is fed by the pawls 21 and 27 to the knife for the cutting of slats of equal thickness from end to end. The pin 67 may be secured in any adjusted position in the slot 66 on the arm 65 for changing the throw of bell crank levers 18 and 26 thereby regulating the thickness of the cut. The pin 65$^a$ to which rod X is connected is adjustable in slot 66.

The stub shaft 64 is mounted in an arm 70 carried by the adjustable bearing standard 13$^a$.

It is of course obvious that I may cut veneer on my machine.

Figure 10:
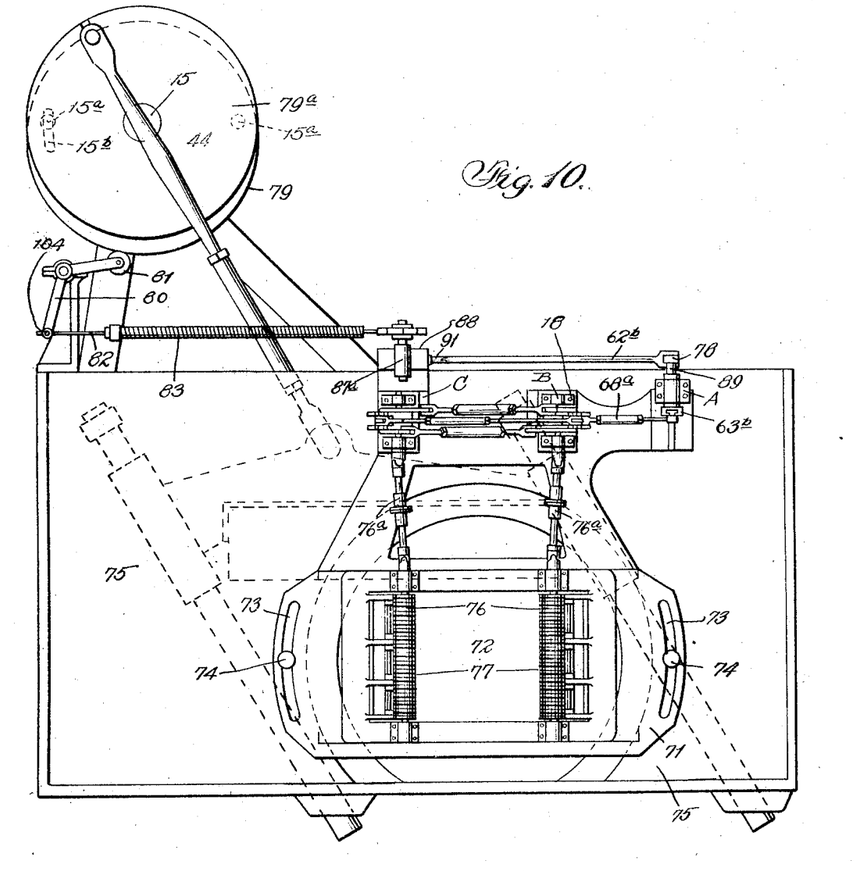
Figure 10 is a top plan view of a machine showing another embodiment of my invention.
Figure 11:
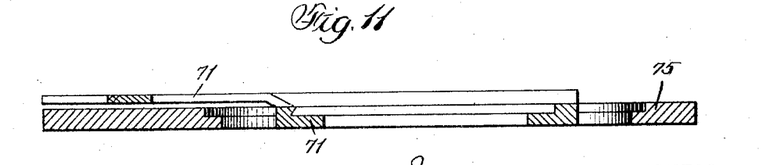
Figure 11 is a detail sectional view through the bed plate and the revoluble table.

In Figure 10 I have shown another embodiment of my invention in which the table 71 through which the block opening 72 is formed, is rotatable, the degree of rotation being governed by means of the arcuate slots 73 in the side edges of the table and the pins 74 which are secured to the bed plate 75 of the machine. As in the other embodiment this table carries the feed rolls 76 and pressure bars 77 which have been heretofore described in detail. Operating shafts 76$^a$ for the feed rolls and power transmitting links rods and etc. are connected with the shafts of the construction heretofore described, but in this embodiment there is a slight difference in the connection between the lever 78 and the power which I will now describe.

A cam wheel 79 is adjustably connected with the disc 79$^a$, which disc is operated as heretofore described in connection with disc 44. A bell crank lever 80 is provided on one of its arms with a roller 81 which is in constant engagement with the periphery of the cam wheel 79. Extending from this lever and secured to it is a push bar 82 mounted in a flexible housing 83, the other end of the bar 82 being connected with a yoke 84 loosely journalled on the shaft 85. A ratchet wheel 86 is keyed to the hollow shaft 85 and is engaged by the pawl 87.

The hollow shaft 85 is journalled in a housing 87$^a$ which is mounted on the air or steam piston casing 88, said housing being connected by ports 89$^a$ and 90, 90$^a$ and 100 with said casing 88, the casing having a piston rod 91 on which is secured piston heads 92 and 93 of any suitable construction. The piston rod 91 is operatively connected to one end of the rod 62$^b$, which, as heretofore described is connected with the arm 78, whereby motion is transmitted to the shaft 89, arm 63$^b$, rod 68$^a$, bell crank 18, and to the other bell crank lever through the rods as heretofore described.

Air or steam from a suitable supply enters the hollow shaft 85 from which it passes through port 94 thence through port 95 in the housing into port 89$^a$, thence into casing 88 against piston head 92 thereby forcing the piston rod 91 to the right, the exhaust passing out through port 90$^a$, port 95$^a$ and port 96 to atmosphere.

The rod 82 at timed intervals pulls on the arm 84 against the tension of spring 97, and through the pawl 87 and ratchet wheel 86 revolves the shaft 85 thus throwing its port 98 into registry with port 99 through the housing 87$^a$ which opens into port 90, whereby the power flows into the piston chamber in front of piston head 93 whereby the rod 91 is pulled to the left and the rod 62$^b$, and its associated parts are again operated, the exhaust now being through port 100, ports 101, 102, to atmosphere, through the chamber 103 formed in one end of the shaft 85.

It will be noted in Figure 10 that I have mounted the bearing standards A. B. C. and the air casing on the revoluble table 71, so that in adjusting the table the relative positions of these parts and the feeding rolls 76 is not disturbed. In moving the table the set screw or lock 104 is loosened to permit the rod 82 to slide through it and after adjustment the rod 82 is again locked by 104 in operative position.

Figure 12:
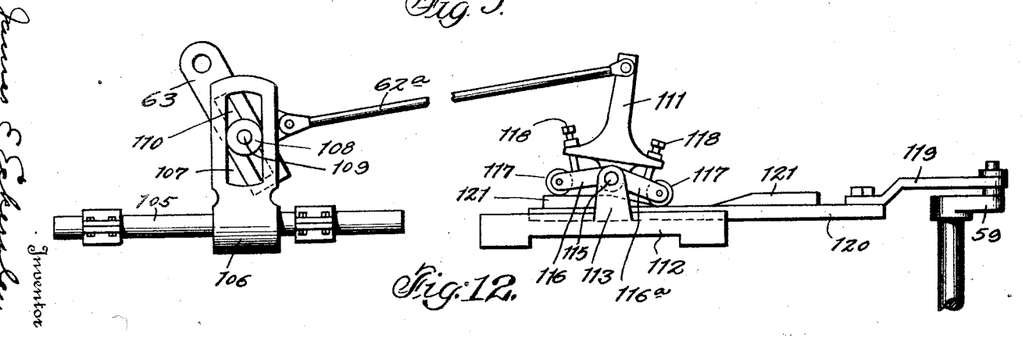
Figure 12 is a front elevation of another embodiment of my invention.

In Figure 12 I have shown another embodiment for operating the rod 62$^a$ and arm 63. In this embodiment I provide a shaft 105 secured to the frame of the machine, on which I slidably mount a link, 106, having an elongated slot 107 in which a roller 108 is adapted to move, the roller 108 being journalled on a pin 109 which in turn is slidably mounted in the undercut slot 110 in the arm 63. One end of the rod 62$^a$ is pivotally secured to the link 106, while the other end is connected to the rocking lever 111.

A bearing 112 is secured to the machine and has ears 113 between which, on pin 115 the rocking lever 111 is pivoted, there being also mounted on this pin 115, frames 116, 116$^a$, having rollers 117 at each end. Set screws 118 are carried by the lever 111 and bear on the frames 116, 116$^a$, for relative adjustment between the lever and frames.

Connected with the crank arm 59 is a link 119 which is also connected to a bar 120 sliding in the bearing 112. This bar 120 has on it in predetermined spaced relation rigid cam blocks 121 which as the bar 120 is reciprocated by the crank 59 rocks the frame 116, 116$^a$, and lever 111, the rollers 117 easily riding up and down the cam blocks 121; this rocking movement of lever 111 pulls on the rod 62$^a$ which in turn operates the link 106 and through roller 108 manipulates arm 63, which in turn is connected to rod 68.

Figure 13:
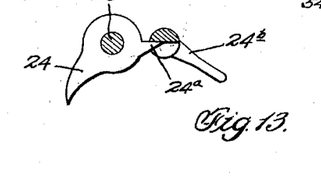
Figure 13 is a detail view of one of the pawls and its operating mechanism.
Figure 14:
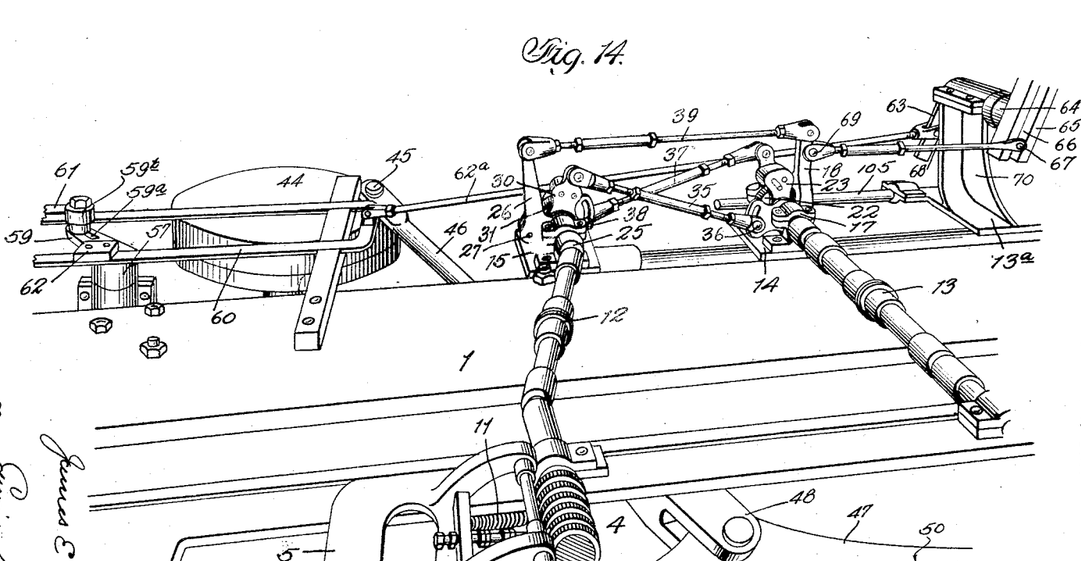
Figure 14 is an enlarged perspective view.
Figure 15:
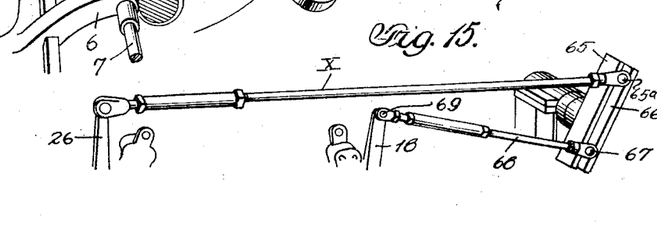
Figure 15 is a detail perspective view.

In Figure 13 I have shown a means to throw the pawls of the bell crank levers out of operation, which means may be of any suitable construction, but for purposes of illustration I have shown the pawl provided with a lug 24$^a$ which is adapted to be engaged by the lever 24$^b$ so that when the lever is operated and strikes lug 24$^a$ the pawl is revolved on its shaft 23.

The cam wheel 79 is mounted on disc wheel 79$^a$ and is keyed to the wheel or disc 79$^a$ by means of bolts 15$^a$ and has a pin and slot connection 15$^b$ with the disc whereby the projection of the cam 79 may be adjusted different degrees relative to the periphery of the disc 79$^a$.

The frames 116 and 116$^a$ are independently adjustable in order that I may use them with cam blocks 121 of different heights.

What I claim is:

1. In a shingle cutting machine, a mechanism for feeding the block to the cutting mechanism; said mechanism comprising spaced feed rolls adapted to engage the ends of the block, a plurality of independently operating pressure bars below each of said rolls and cooperating with the rolls in the feed of said block, and means to yieldingly hold each bar to its work independently of the other bars.

2. In a shingle cutting machine, a mechanism for feeding the block to the cutting mechanism; said mechanism comprising spaced feed rolls adapted to engage the ends of the block, a plurality of pressure bars below each of said rolls and cooperating with the rolls in the feed of said block, the forward end of said pressure bars being concaved to guide the block in its downward movement, the pressure bars moving backward under tension until the block reaches the lower end of the concave where it is held for the cutting operation.

3. A block feeding mechanism for a shingle machine comprising a pair of feeding rolls, a plurality of substantially L shape pressure bars pivotally mounted in the rear of said rolls, the lower end of the bars extending below and slightly in advance of the periphery of said rolls, the forward end of the bars being concaved to guide the block to cutting position where it is held during the cutting operation, springs suitably mounted and yieldingly holding said bars in operative position.

4. In a machine of the character described, means for operating the block feeding rolls for shooks, shingles, veneer, and the like;

said means comprising ratchet driving wheels connected to the feed rolls by suitable shafts, a bell crank lever loosely journalled on each of said shafts near said ratchet wheels, pawls carried by said bell crank levers and adapted to engage said ratchet wheels, a rod connecting the upper ends of said bell crank levers, an arm mounted on each of said shafts besides said bell crank levers, pawls carried by said arms adapted to engage said ratchet wheels, rods connected at one end to said last mentioned arms and at their other ends connected by a pin and slot connection to the bell crank levers.

5. In a machine of the character described, means for operating the block feeding rolls, for shooks, shingles, veneer, and the like; said means comprising ratchet driving wheels connected to the feed rolls by suitable shafts, a bell crank lever loosely journalled on each of said shafts near said ratchet wheels, pawls carried by said bell crank levers and adapted to engage said ratchet wheels, a rod connecting the upper ends of said bell crank levers, an arm mounted on each of said shafts besides said bell crank levers, pawls carried by said arms adapted to engage said ratchet wheels, rods connected at one end to said last mentioned arms and at their other ends connected by a pin and slot connection to the bell crank levers, a knife and means to operate said knife intermediate the operation of the feed rolls.

6. In a shingle cutting machine, a frame bed plate, a knife slidably mounted under said plate, and means to reciprocally operate said knife, in combination with a block holding table mounted on said plate and having a single block opening therethrough, said table being bodily adjustable in the plane of the bed plate relatively to the path of movement of the knife, block feed rolls at each end of said opening, and means to operate said rolls.

7. In a shingle cutting machine, a bed plate, a knife slidably mounted under said plate, and means to reciprocally operate said knife, in combination with a block holding table mounted on said plate and having a single block opening therethrough, said table being bodily adjustable in the plane of the bed plate relative to the path of movement of the knife, block feeding rolls at each end of said openings, means on said table to operate said rolls and a source of power connected with said means.

In testimony whereof I affix my signature.

JAMES E. ECKERSLEY.